United States Patent
Milne et al.

(10) Patent No.: US 9,361,802 B2
(45) Date of Patent: Jun. 7, 2016

(54) VEHICLE AD HOC NETWORK (VANET)

(71) Applicant: SONY CORPORATION, Tokyo (JP)

(72) Inventors: James R. Milne, Ramona, CA (US); Gregory Peter Carlsson, Santee, CA (US); Frederick J. Zustak, Poway, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/332,900

(22) Filed: Jul. 16, 2014

(65) Prior Publication Data

US 2016/0019788 A1    Jan. 21, 2016

(51) Int. Cl.
| | | |
|---|---|---|
| *G08G 1/123* | (2006.01) | |
| *G08G 1/133* | (2006.01) | |
| *G08G 1/0967* | (2006.01) | |
| G08G 1/16 | (2006.01) | |
| H04W 84/18 | (2009.01) | |

(52) U.S. Cl.
CPC .......... *G08G 1/133* (2013.01); *G08G 1/096791* (2013.01); *G08G 1/163* (2013.01); *G08G 1/162* (2013.01); *H04W 84/18* (2013.01)

(58) Field of Classification Search
CPC ...................................................... G08G 1/161
USPC ........................ 340/988, 995, 932.2, 933, 945
See application file for complete search history.

(56) References Cited

U.S. PATENT DOCUMENTS

| | | |
|---|---|---|
| 3,985,357 A | 10/1976 | Miller |
| 4,123,511 A | 10/1978 | Heintze |
| 4,301,207 A | 11/1981 | Schomerus |
| 4,340,053 A | 7/1982 | Sarui |
| 4,463,949 A | 8/1984 | McCoy, Sr. et al. |
| 4,625,336 A | 12/1986 | Derderian |
| 4,962,935 A | 10/1990 | Williams |
| 4,992,003 A | 2/1991 | Perach |
| 5,154,266 A | 10/1992 | Bieber et al. |
| 5,201,075 A | 4/1993 | Svetich |
| 5,219,316 A | 6/1993 | Huffman |
| 5,413,328 A | 5/1995 | Glancey et al. |
| 5,639,243 A | 6/1997 | Ryan et al. |
| 5,755,405 A | 5/1998 | Socha et al. |
| 5,927,233 A | 7/1999 | Mainini et al. |
| 6,401,250 B1 | 6/2002 | McNabb |
| 6,438,755 B1 | 8/2002 | MacDonald et al. |
| 6,588,840 B1 | 7/2003 | Lombardo |
| 6,742,636 B2 | 6/2004 | Godshaw |
| 6,810,831 B1 | 11/2004 | Opfel |
| 6,910,447 B1 | 6/2005 | Azarian |
| 7,323,981 B2 | 1/2008 | Peel et al. |
| 7,328,671 B2 | 2/2008 | Kates |
| 7,416,123 B2 | 8/2008 | Saperstein et al. |

(Continued)

OTHER PUBLICATIONS

James R. Milne, Gregory Peter Carlsson, Frederck J. Zustak, "Applying Mesh Network to Pet Carriers", related U.S. Appl. No. 14/333,066, Applicant's response to Final Office Action filed Oct. 28, 2015.

(Continued)

*Primary Examiner* — Tai T Nguyen
(74) *Attorney, Agent, or Firm* — John L. Rogitz

(57) ABSTRACT

Mesh node modules are associated with vehicles and companion nodes can dynamically form a mesh network which uploads location information of the nodes and in some cases additional information, e.g., road condition or proximity to objects.

18 Claims, 3 Drawing Sheets

(56) References Cited

U.S. PATENT DOCUMENTS

| | | | |
|---|---|---|---|
| 7,438,356 | B2 | 10/2008 | Howman et al. |
| 7,451,927 | B2 | 11/2008 | Saperstein et al. |
| 7,626,966 | B1 | 12/2009 | Ruiter et al. |
| 7,714,708 | B2 | 5/2010 | Brackmann et al. |
| 7,753,826 | B1 | 7/2010 | Oliver et al. |
| 7,770,539 | B1 | 8/2010 | Zimmerman et al. |
| 7,818,820 | B2 | 10/2010 | Tsujimoto |
| 7,916,025 | B2 | 3/2011 | Locker et al. |
| 8,253,557 | B2 | 8/2012 | Ani et al. |
| 8,366,570 | B1 | 2/2013 | DeMarco et al. |
| 8,568,191 | B2 | 10/2013 | Rehkemper et al. |
| 8,609,454 | B2 | 12/2013 | Dai et al. |
| 8,624,743 | B2 | 1/2014 | Langer et al. |
| 8,878,671 | B2 | 11/2014 | Buchheim et al. |
| 2004/0125493 | A1 | 7/2004 | Shimotono et al. |
| 2004/0141635 | A1 | 7/2004 | Liang et al. |
| 2004/0167367 | A1 | 8/2004 | Beierle |
| 2005/0034083 | A1 | 2/2005 | Jaeger |
| 2005/0259033 | A1* | 11/2005 | Levine .............. B60K 26/00 345/7 |
| 2005/0284405 | A1 | 12/2005 | Pomakoy-Poole et al. |
| 2006/0063540 | A1 | 3/2006 | Beuck |
| 2006/0080072 | A1 | 4/2006 | Lachman et al. |
| 2006/0154642 | A1 | 7/2006 | Scannell, Jr. |
| 2006/0242901 | A1 | 11/2006 | Casimaty et al. |
| 2007/0138272 | A1 | 6/2007 | Saperstein et al. |
| 2007/0138273 | A1 | 6/2007 | Saperstein et al. |
| 2007/0152479 | A1 | 7/2007 | Howman et al. |
| 2007/0243296 | A1 | 10/2007 | Bourassa et al. |
| 2008/0036610 | A1 | 2/2008 | Hokuf et al. |
| 2008/0120768 | A1 | 5/2008 | Tsujimoto |
| 2008/0173257 | A1 | 7/2008 | Steiner et al. |
| 2008/0229704 | A1 | 9/2008 | Augustyniak et al. |
| 2009/0118869 | A1 | 5/2009 | Cauchy et al. |
| 2009/0203367 | A1 | 8/2009 | Pamminger et al. |
| 2010/0119755 | A1 | 5/2010 | Chung et al. |
| 2010/0123778 | A1* | 5/2010 | Hada .............. B60R 1/00 348/148 |
| 2010/0295687 | A1 | 11/2010 | Kuzniar et al. |
| 2011/0005466 | A1 | 1/2011 | Furth |
| 2012/0069051 | A1 | 3/2012 | Hagbi et al. |
| 2012/0099800 | A1 | 4/2012 | Llano et al. |
| 2013/0056929 | A1 | 3/2013 | Rehkemper et al. |
| 2013/0068942 | A1 | 3/2013 | Verenchikov |
| 2013/0093220 | A1 | 4/2013 | Pajic |
| 2013/0292976 | A1 | 11/2013 | Kane |
| 2014/0023060 | A1 | 1/2014 | Apte et al. |
| 2014/0025805 | A1 | 1/2014 | Apte et al. |
| 2014/0104046 | A1 | 4/2014 | Howell |
| 2014/0118635 | A1 | 5/2014 | Yang |
| 2014/0179463 | A1 | 6/2014 | Giles et al. |
| 2015/0348413 | A1* | 12/2015 | Han .............. G08G 1/161 340/933 |
| 2016/0019515 | A1 | 1/2016 | Milne et al. |
| 2016/0021491 | A1 | 1/2016 | Milne et al. |
| 2016/0021492 | A1 | 1/2016 | Carlsson et al. |
| 2016/0021493 | A1 | 1/2016 | Milne et al. |
| 2016/0021510 | A1 | 1/2016 | Milne et al. |

OTHER PUBLICATIONS

Arzoo Dahiya, Dr. R.K. Chauhan, "A Comparative Study of MANET and VANET Environment" Journal of Computing, vol. 2, Issue 7, Jul. 2010, ISSN 2151-9617. http://sites.google.com/site/JournalofComputing/.

Yousaf Saeed, Suleman Aziz Lodhi, Khalil Ahmed, "Obstacle Management in VANET using Game Theory and Fuzzy Logic Control", ACEEE Int. J. on Communications, vol. 4, No. 1, Jul. 2013.

The Seventh ACM International Workshop on Vehicular Inter-NETworking (VANET 2010) in conjunction with ACM MobiCom 2010. Sep. 24, 2010.

Tao Zhang, Xian Chen, Russell Hsing, K. Dnaiel Wong,"VNTA sub-TC" IEEE Communications Society, printed from web Jun. 3, 2014, http://www.danielwireless.com/vnta/.

Reza Azimi, Gaurav Bhatia, Ragunathan (Raj) Rajkumar, Priyantha Mudalige, "Vehicular Networks for Collision Avoidance at Intersections" Society for Automotive Engineers (SAE) World Congress, Apr. 2011, Detroit, MI, USA.

Timo Kosch, Christian Adler, Stephan Eichler, Christopher Schroth, Markus Strassberger, "The Scalability problem of vehicular ad hoc networks and how to solve it", IEEE Wireless Communications Magazine 13, Oct. 2006, No. 5, S.6. http://www.alexandria.unisg.ch/Publikationen/30977.

Danda B. Rawat, Dimitrie C. Popescu, Gongjun Yan, Stephan Olariu, "Enhancing VANET Performance by joint Adaptation of Transmission Power and Contention Window Size", IEEE Transaction on Parallel and Distributed Systems, vol. 22, No. 9, pp. 1528-1535, Sep. 2011.

Stephan Eichler, Benedikt Ostermaier, Christopher Schroth, Timo Kosch, "Simulation of Car-to-Car Messaging: Analyzing the Impact on the Road Traffic", IEEE Computer Society, 2005; 13th Annual Meeting of the IEEE International Symposium on Modeling, Analysis, and Simulation of Computer and Telecommunications Systems (MASCOTS).

J. Gonzalvez, M. Sepulcre, R. Bauza, "IEEE 802.11p Vehicle to Infrastructure Communications in Urban Environments" IEEE Communications Magazine, vol. 50, No. 5, pp. 176-183, May 2012.

Charles McCoy, James R. Milne, True Xiong, "Portable Device to Portable Drive Wireless Power Transfer Methods and Systems" file history of related pending U.S. Appl. No. 14/290,409, filed May 29, 2014.

James R. Milne, Charles McCoy, True Xiong, "Scalable Antenna System" file history of related pending U.S. Appl. No. 14/290,426 filed, May 29, 2014.

Charles McCoy, James R. Milne, True Xiong, "Method and System for Use in Configuring Multiple Near Field Antenna Systems" file history of related pending U.S. Appl. No. 14/460,224, filed Aug. 14, 2014.

James R. Milne, Gregory Peter Carlsson, Frederick J. Zustak, "Applying Mesh Networks to Pet Carriers", related U.S. Appl. No. 14/333,006, Non-Final Office Action dated Aug. 27, 2015.

James R. Milne, Gregory Peter Carlsson, Frederick J. Zustak, "Applying Mesh Network to Pet Carriers", related U.S. Appl. No. 14/333,006, Non-Final Office Acton filed Aug. 31, 2015.

James R. Milne, Gregory Peter Carlsson, Frederick J. Zustak, "Applying Mesh Network to Pet carrier", applicants response to final office action filed Oct. 28, 2015 in related pending U.S. Appl. No. 14/333,006.

James R. Milne, Gregory Peter Carlsson, Frederick J. Zustak, "Applying Mesh Network to Pet carrier", non-final office action dated Dec. 4, 2015 in related pending U.S. Appl. No. 14/333,006.

James R. Milne, Gregory Peter Carlsson, Frederick J. Zustak, "Applying Mesh Network to Pet carrier", applicants response to non-final office action filed Dec. 10, 2015 in related pending U.S. Appl. No. 14/333,006.

James R. Milne, Gregory Peter Carlsson, Frederick J. Zustak, "Applying Mesh Network to Pet Carriers", related U.S. Appl. No. 14/333,006, Final Office Action dated Oct. 28, 2015.

James R. Milne, Gregory Peter Carlsson, Frederick J. Zustak, "Applying Mesh Network to Luggage", related U.S. Appl. No. 14/332,919, Applicant's response to Non-Final Office Action filed Feb. 11, 2016.

James R. Milne, Gregory Peter Carlsson, Frederick J. Zustak, "Applying Mesh Network to Luggage" related pending U.S. Appl. No. 14/332,919, filed Jul. 16, 2014.

James R. Milne, Gregory Peter Carlsson, Frederick J. Zustak, "Applying Mesh Network to Pet carrier", related pending U.S. Appl. No. 14/333,006, filed Jul. 16, 2014.

James R. Milne, Gregory Peter Carlsson, Frederick J. Zustak, "Applying Mesh Network to Stadium Services", related pending U.S. Appl. No. 14/332,849, filed Jul. 16, 2014.

(56) References Cited

OTHER PUBLICATIONS

James R. Milne, Gregory Peter Carlsson, Frederick J. Zustak, "Mesh Network Applied to Fixed Establishment with Movable Items Therein", related pending U.S. Appl. No. 14/332,836, filed Jul. 16, 2014.

Gregory Peter Carlsson, Frederick J. Zustak, James R. Milne, "Mesh Network Applied to Arena Events", related pending U.S. Appl. No. 14/332,953, filed Jul. 16, 2014.

James R. Milne, Gregory Peter Carlsson, Frederick J. Zustak, "Applying Mesh Network to Luggage", related pending U.S. Appl. No. 14/332,919, non-final office action dated Jan. 20, 2016.

\* cited by examiner

VEHICLE AD HOC NETWORK (VANET)

FIELD OF THE INVENTION

The application relates generally to vehicle ad hoc networks (VANETs).

BACKGROUND OF THE INVENTION

A mesh network is a type of computer ecosystem characterized by its sustainability, self-organization, and scalability. Each mesh node relays network data flowing to the node, and the nodes cooperate to appropriately distribute the data in the network. Typically, mesh networks are relatively short range networks, i.e., with node-to-node link distances of 250 meters or less, although a mesh network may use a gateway to connect to a wide area network such as the Internet.

Because mesh networks typically are wireless, they are ad hoc, meaning that nodes easily join and leave the network. As but one example, mesh networks can be spontaneously organized by the wireless computing devices establishing the nodes using Zigbee. Other example non-limiting mesh network protocols/systems can be based on Wi-Fi IEEE 802.11p, IEEE 802.11s, WAVE IEEE 1609, WiMAX IEEE 802.16, Bluetooth, and IRA.

When the wireless nodes of a mesh network move as the network operates, the network is sometimes referred to as a mobile ad hoc network (MANET) which continuously self-configures as nodes move into network range and out of network range. For this reason, nodal links in MANETs change frequently. MANETs may operate independently but may also use one or more of the nodes as a gateway to other MANETs and other networks such as the Internet.

Of relevance to this application is the application of mesh/MANET principles to vehicles to establish a vehicle ad hoc network (VANET).

SUMMARY OF THE INVENTION

As understood herein, current traffic monitoring methods are relatively slow, as they rely primarily on news updates heard on the radio, TV or internet. And often these "updates" don't provide alternative choices. Also the available traffic information typically only covers major highways and freeways.

Accordingly, a display device includes a display, a computer readable storage medium bearing instructions executable by a processor, and a processor configured for accessing the computer readable storage medium to execute the instructions to configure the processor to present on the display a user interface (UI). The UI indicates a location of the device on which the UI is presented, along with locations of plural vehicles in a wireless mesh network that includes a vehicle in which the UI is presented, with the locations of the other vehicles being received through the mesh network.

In some embodiments the UI presents arrows whose magnitudes and directions are defined by headings and speeds of respective vehicles as reported via the mesh network. If desired, the UI can present an alpha-numeric indication of a speed of a vehicle other than the vehicle in which the UI is presented. In examples, the UI includes an alpha-numeric indication of a type of a vehicle reporting via the mesh network.

In some implementations the UI presents icons unique to vehicle types based on type information reported by the vehicles through the mesh network. The UI may, if desired, present an alpha numeric indication of a vehicle having a speed satisfying a threshold.

In another aspect, a display device includes a display, a computer readable storage medium bearing instructions executable by a processor, and a processor configured for accessing the computer readable storage medium to execute the instructions to configure the processor to present on the display a user interface (UI) including one or more filter selectors selectable to filter traffic/road reports uploaded from vehicle ad hoc networks (VANETs) and presented on the UI.

In another aspect, a method includes automatically establishing a vehicle ad hoc network (VANET) among node modules of adjacent vehicles such that as vehicle travels it dynamically enters and leaves mesh networks formed by its node module and node modules of other vehicles that are sufficiently nearby to permit mesh network communication. The method also includes uploading, through the VANET, vehicle parameters received by the node modules, and uploading, through the VANET, signals from sensors reported to a node module. Also, the method includes reporting, through the VANET, detection of a group of vehicles in a mesh network, with a location of the group being propagated back through the VANET to inform of the presence of the group, to enable drivers to take appropriate precautions.

In some examples a node module of a vehicle does not establish a mesh network with nearby node modules even if the nearby modules are sufficiently close unless a predetermined event occurs. This event may be, e.g., braking, weather, and/or detection of a slow moving object.

The details of the present invention, both as to its structure and operation, can be best understood in reference to the accompanying drawings, in which like reference numerals refer to like parts, and in which:

DETAILED DESCRIPTION

Figure 1:
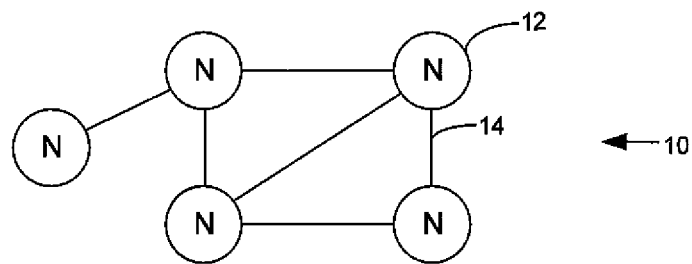
FIG. 1 is a block diagram of an example system including an example in accordance with present principles.

This disclosure relates generally to computer ecosystems and in particular to mesh networks and MANETs. A system herein may include server and client components that establish mesh network nodes, connected over a network such that data may be exchanged between the client and server components, although mesh networks may not include servers. The nodes may include one or more computing devices including portable televisions (e.g. smart TVs, Internet-enabled TVs), portable computers such as laptops and tablet computers, and other mobile devices including smart phones, mesh node modules that can be attached to moving objects, and additional examples discussed below. These devices may operate with a variety of operating environments. For example, some of the devices may employ, as examples, operating systems from Microsoft, or a Unix operating system, or operating systems produced by Apple Computer or Google.

Nodes, however implemented, may include one or more processors executing instructions that configure the node to receive and transmit data over a mesh network such as a MANET. A device such as a server may be instantiated by a game console such as a Sony Playstation (trademarked), a personal computer, etc.

Information may be exchanged over a network between network nodes. To this end and for security, nodes can include firewalls, load balancers, temporary storages, and proxies, and other network infrastructure for reliability and security. One or more nodes may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example mesh network 10 is shown, which may include one or more of the example devices mentioned above and described further below in accordance with present principles. These devices establish respective nodes 12 of the mesh network 10. The nodes 12 can spontaneously join and leave the network 10 as mentioned above, and when a node is a member of the network 10, it communicates with at least some of the other nodes 12 via wireless links 14. The nodes 12 may all be connected to every other node, or more typically are connected only to one or more of the other nodes, forwarding data through the network using "hop" principles and other relevant mesh protocol principles.

The nodes 12 may all be mobile nodes and may communicate only within the network 10, and not outside the network 10. More typically, at least one of the nodes 12 is a router or other gateway device that interfaces the mesh network 10 with other networks, such as the Internet. In some embodiments, one or more of the nodes 12 may be a fixed node, e.g., a gateway router or a server whose location does not change after installation or changes only infrequently, with the remaining node(s) 12 being mobile, while in some embodiments all of the nodes 12 may be fixed nodes.

In any case, the node 12 dynamically establish a mesh network, typically through one or more of the short-range transmitters described below. Each node typically is associated with a unique identification such as a media access control (MAC) address, and the MAC address may be correlated within the node (e.g., at time of manufacture or by a user at time of association with a particular component) or within a network server receiving information from the node with an identification of the component with which the MAC address is associated. For example, a nodal module may be associated with a vehicle, a person, an animal, a bicycle, a piece of luggage or a pet kennel, a particular stadium seat, an item in a factory or store, a user's CE device, etc., and the MAC address of that node may be correlated with the component accordingly. Consequently, when a mesh network is established and at least one of the network nodes uploads information gathered from the other nodes, that information may include (or be correlated at a server to) a type of component, so that a network map or other network information user interface (UI) may be presented showing the mesh nodes along with an identification of the components, and not just the MAC addresses, with which the nodes are associated.

Figure 2:
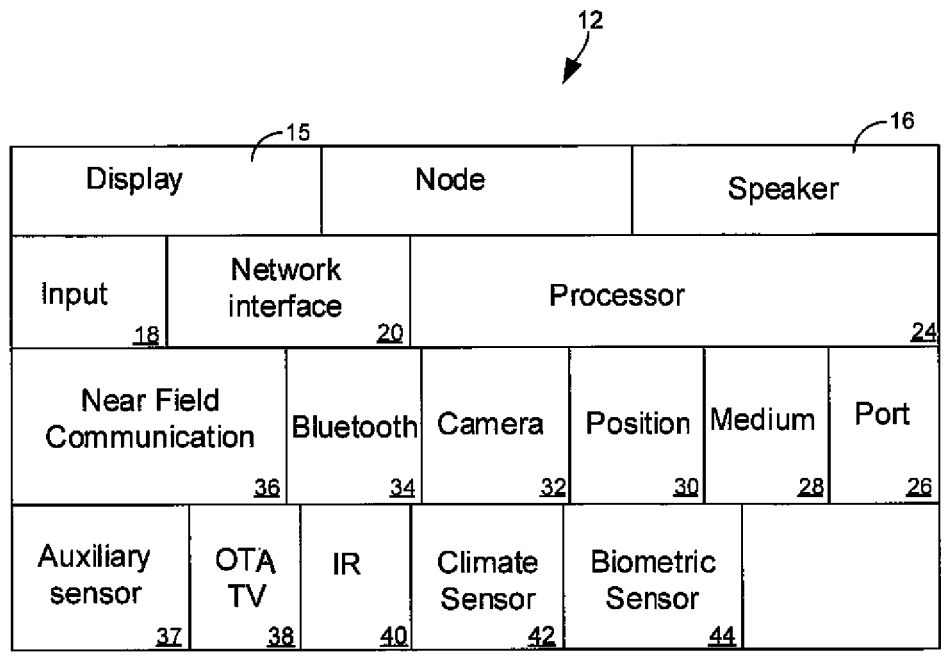
FIG. 2 is a schematic diagram of an example node.

FIG. 2 shows that an example node 12 can (but not must) include one or more displays 15 that may be implemented by a high definition or ultra-high definition "4K" or higher flat screen and that may be touch-enabled for receiving user input signals via touches on the display. The node 12 may include one or more speakers 16 for outputting audio in accordance with present principles, and at least one additional input device 18 such as e.g. an audio receiver/microphone for e.g. entering audible commands to the node 12 to control the node 12. The example node 12 may also include one or more network interfaces 20 for communication over at least one network under control of one or more processors 24. Thus, the interface 20 may be, without limitation, a Wi-Fi transceiver, which is an example of a wireless computer network interface. It is to be understood that the processor 24 controls the node 12 to undertake present principles, including the other elements of the node 12 described herein such as e.g. controlling the display 15 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the node 12 may also include one or more input ports 26 such as, e.g., a high definition multimedia interface (HDMI) port or a USB port to physically connect (e.g. using a wired connection) to another CE device and/or a headphone port to connect headphones to the node 12 for presentation of audio from the node 12 to a user through the headphones. For example, the input port 26 may be connected via wire or wirelessly to a cable or satellite source of audio video content. Thus, the source may be, e.g., a set top box, or a satellite receiver, or a game console or disk player.

The node 12 may further include one or more tangible computer readable storage medium 28 such as disk-based or solid state storage. Also in some embodiments, the node 12 can include one or more position or location receivers such as but not limited to a cellphone receiver, GPS receiver and/or altimeter 30 that is configured to e.g. receive geographic position information from at least one satellite or cellphone tower and provide the information to the processor 24 and/or determine an altitude at which the node 12 is disposed in conjunction with the processor 24. However, it is to be understood that that another suitable position receiver other than a cellphone receiver, GPS receiver and/or altimeter may be used in accordance with present principles to e.g. determine the location of the node 12 in e.g. all three dimensions.

Continuing the description of the node 12, in some embodiments the NODE 12 may include one or more cameras 32 that may be, e.g., a thermal imaging camera, a digital camera such as a webcam, and/or a camera integrated into the node 12 and controllable by the processor 24 to gather pictures/images and/or video in accordance with present principles. Also included on the node 12 may be a Bluetooth transceiver 34 and other Near Field Communication (NFC) element 36 for communication with other devices using Bluetooth and/or NFC technology, respectively. An example NFC element can be a radio frequency identification (RFD)) element.

Further still, the node 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), other type of proximity sensor such as a camera executing image recognition to determine a particular object is close, etc.) providing input to the processor 24. The node 12 may include an over-the-air TV broadcast port 38 for receiving OTA TV broadcasts providing input to the processor 24. In addition to the foregoing, it is noted that the node 12 may also include an infrared (IR) transmitter and/or IR receiver and/or IR transceiver 40 such as an IR data association (IRDA) device. A battery (not shown) may be provided for powering the node 12.

The node 12 may include still other sensors such as e.g. one or more climate sensors 42 (e.g. barometers, humidity sensors, wind sensors, light sensors, temperature sensors, etc.) and/or one or more biometric sensors 44 providing input to the processor 24. For instance, the biometric sensor(s) may include heart rate sensors, temperature sensors, blood pressure sensors, blood sugar sensors, perspiration sensors, etc.

The above methods may be implemented as software instructions executed by a processor, suitably configured ASIC or FPGA modules, or any other convenient manner as would be appreciated by those skilled in those art. Where employed, the software instructions may be embodied in a non-transitory device such as a CD Rom or Flash drive. The software code instructions may alternatively be embodied via a download over the internet.

Figure 3:
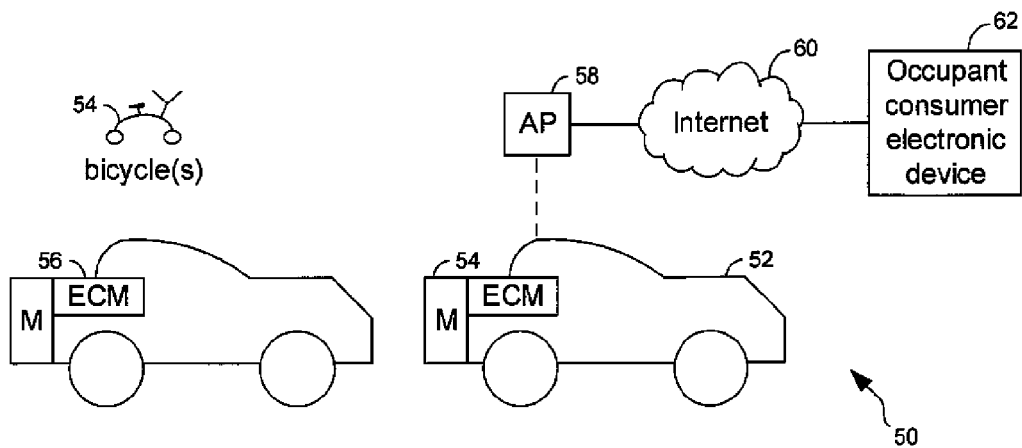
FIG. 3 is a schematic diagram of a VANET.

FIG. 3 shows an example mesh network 50 in which one or more vehicles 52 are associated with respective node modules 54 each of which may be implemented by the appropriate components of the example node in FIG. 2. Note that various sensors of a module 54 may be located on a single module body or physically distributed in appropriate locations of a vehicle, communicating with the processor of the module. Note further that each vehicle may include an engine control module (ECM) 56 that is separate from or integrated with the node module 54 of the vehicle. In the case of a bicycle, the node module may be mounted on the bicycle frame or on an item worn by the rider, e.g., on the rider's helmet.

By "vehicle" is meant the plain and ordinary meaning of the term, to wit: motorized automobiles, trucks, motorcycles, and bicycles for transporting occupants in or on.

The modules 54 communicate with each other according to mesh network principles mentioned previously, and when a vehicle 52 is sufficiently close to a network access point (AP) 58, mesh network 50 node and link information may be uploaded to a network such as the Internet 60 for provision of the network information to a CE device 62, typically associated with an occupant of the vehicle 52. The CE device 62 may be implemented by some or all of the components shown in FIG. 2 for a network node. Preferably, many APs are provided so that the mesh network can frequently communicate with the Internet.

It is to be understood that the CE device 62 may be registered by an Internet server to be associated with the vehicle 52. In an example non-limiting embodiment, the owner of the CE device 62 may co-locate the device 62 and the vehicle 52 prior to travel in an initial mesh, with the nodes exchanging information and with the CE device recording the MAC addresses and/or recording or establishing (using user input) component names (e.g., "vehicle 1, vehicle 2, . . . "). The CE device 62 may download a tracking application from the Internet for this purpose, and then upload, using the application, the identity of the vehicles associated with the CE device, along with the CE device network address. In this way, an Internet server subsequently receiving information pertaining to the MAC address or other identification of the vehicle(s) can download the information to the CE device executing the tracking application.

Figure 4:
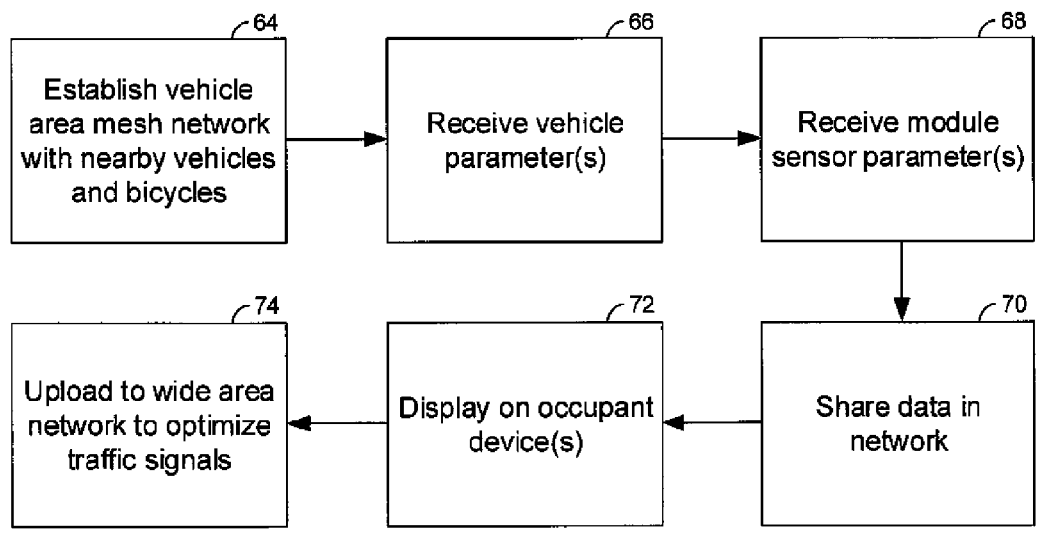
FIG. 4 is a flow chart of example non-limiting logic.

FIG. 4 illustrates example logic. At block 64, a VANET is established automatically by the node modules 54 of adjacent vehicles, to also include, when sufficiently close, adjacent VANETs such as a VANET established by the node modules of a group of nearby bicyclists. Thus, as a car, for example, travels down the road, it dynamically enters and leaves mesh networks formed by its node module and the node modules of other vehicles that are sufficiently nearby the car to permit mesh network communication. If desired, a node module 54 of a vehicle 52 may not seek to establish a mesh network with nearby node modules even if the other modules are sufficiently close unless a predetermined event occurs. For example, a node module 54 of a vehicle 52 may not seek to establish a mesh network with nearby node modules even if the other modules are sufficiently close unless sudden braking of the associated vehicle occurs. Or, a node module 54 of a vehicle 52 may not seek to establish a mesh network with nearby node modules even if the other modules are sufficiently close unless inclement road weather is sensed. Yet again, a node module 54 of a vehicle 52 may not seek to establish a mesh network with nearby node modules even if the other modules are sufficiently close unless a relatively slow moving object such as a bicycle is sensed by, e.g., a proximity sensor such as a camera.

Block 66 indicates that vehicle and other parameters are received by the processor of a node module. For example, the processor may receive signals from the associated ECM that the vehicle is braking hard, or otherwise rapidly decelerating, or even skidding as sensed by skid sensors of, e.g., the ABS of the vehicle. Similarly, at block 68 the processor may receive signals from a moisture sensor on the vehicle. Yet again, the processor may receive signals from a proximity sensor on the vehicle indicating that another object such as a bicyclist or group of bicyclists is within range of the proximity sensor.

At block 70, the node modules in the dynamic mesh network share data among themselves that may be presented on, e.g., the CE device 62, which can also be part of the mesh network 50 as mentioned above. When at least one node of the mesh network is in range of an AP 58, the information gathered at blocks 66 and 68 can be uploaded to a traffic control server via the Internet 60.

Thus, mesh networks among vehicles can be dynamically formed to track in real-time various parameters such as approaching slower traffic ahead, as well as provide better up-to-date traffic information regarding traffic accidents, construction, and detours. The mesh network 50 is dynamic in the sense that vehicles join or leave the network at any time.

Furthermore, as stated above one mesh network, e.g., of motorized vehicle, can be made aware of another nearby mesh network once a node in the motorized vehicle network is within range and establishes communication with a node in the bicyclist network. The location of the bicyclist group can be propagated back through the motorized vehicles to inform the drivers of the motorized vehicles of the presence of the bicyclists, to enable the drivers to take appropriate precautions.

Moreover, by uploading information at block 74, a statewide or nationwide data base can be updated to maintain track of all the various mesh groups to enable more accurately relayed traffic information for all travelers. The real-time information from one mesh network can be made available to all mesh networks to aid in collision avoidance or rerouting around trouble areas. This real time database can also influence the timing of traffic lights to optimize traffic flow during rush hour, and to route the closest emergency vehicles as quickly as possible to accident or incident scenes.

Figure 5:
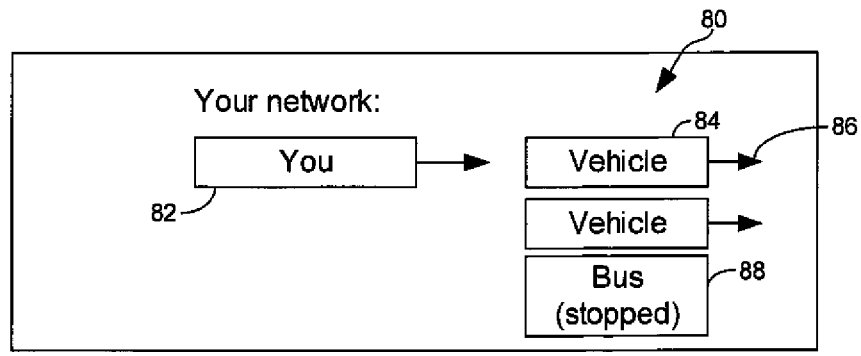
FIGS. 5-7 are screen shots of example user interfaces for vehicle occupant's CE device or other display device, elements of which UIs may be combined with each other in some embodiments.

FIG. 5 shows a user interface (UI) 80 that may be presented on, e.g., the CE device 62 or on a display mounted in a vehicle 52, as examples. As shown, the UI 80 indicates a location 82 of the device on which the UI is presented, along with locations 84 of other vehicles in the mesh network that includes the vehicle in which the UI 80 is presented. In the example, the nodes report location, vehicle type, speed and heading information to each other, and responsive to this information the processor presenting the UI also presents arrows 86 whose magnitudes and directions are defined by the reported headings and speeds of the respective vehicles. As indicated at 88, when a vehicle reports zero speed, "stopped" may be indicated on the UI. Moreover, vehicles may report their types, so that each vehicle indication 84 may include an alpha-numeric indication of the type of the reporting vehicle, e.g., bus, bicycle, truck, sedan, etc.

Figure 6:
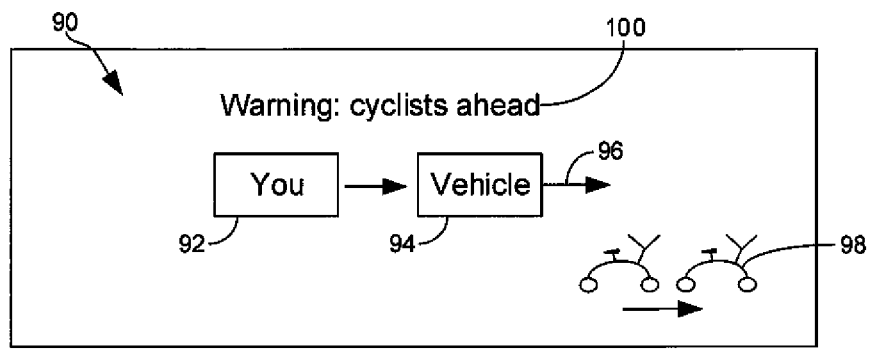

FIG. 6 shows a UI 90 that may be presented on, e.g., the CE device 62 or on a display mounted in a vehicle 52, as examples. As shown, the UI 90 indicates a location 92 of the device on which the UI is presented, along with locations 94 of other vehicles in the mesh network that includes the vehicle in which the UI 90 is presented. In the example, the nodes report location, vehicle type, speed and heading information to each other, and responsive to this information the processor presenting the UI also presents arrows 96 whose magnitudes and directions are defined by the reported headings and speeds of the respective vehicles.

In this example, the lead vehicle in the mesh network has made contact with a group of networked bicyclists, and so presents images or icons 98 unique to bicycles. Also, the processor presenting the UI 90 may be programmed, when slow-moving nodes such as bicycles are encountered, so present an alpha numeric indication 100 thereof as a warning of such slower moving vehicles.

Figure 7:
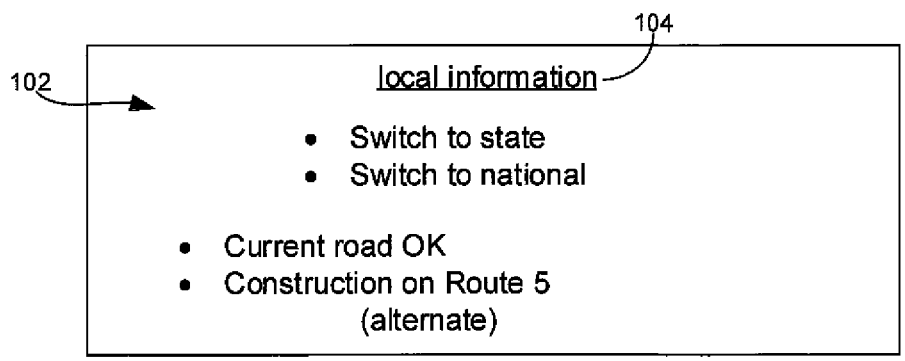

FIG. 7 shows a UI 102 that may be presented on, e.g., the CE device 62 or on a display mounted in a vehicle 52, as examples. As shown, the UI 102 includes one or more filter selectors 104 selectable to filter the traffic/road reports presented on the UI 102. In the example shown, the filter selectors 104 include a "local" selector which when selected causes information, including map information if desired, to be presented on the display showing information only within the proximity of the display, e.g., within a ten mile radius. Also, the filter selectors 104 may include a "state" selector which when selected causes information, including map information if desired, to be presented on the display showing information only for the entire state in which the display is located. Moreover, the filter selectors 104 may include a "national" selector which when selected causes information, including map information if desired, to be presented on the display showing information only for the entire nation in which the display is located. The larger the scale, the more (and more precise) information is presented; the smaller the scale, the less (and less precise) information is presented.

Thus, each individual, in a mesh group or not, can filter information based on their needs. For example, if traveling to work, only local information may be desired, whereas if traveling across country, statewide or national information may be desired.

Indications 106 may also be presented based on information reported by the VANET in which the display is located or by other VANETs uploaded as described above and downloaded to the device presenting the UI 102 indicating current road condition, the existence and location of traffic-impacting activities such as construction, etc.

It will be appreciated that while the APPLYING MESH NETWORK TO VANETS has been fully described in relation to one or more example embodiments, these are not intended to be limiting, and that various alternative arrangements may be used to implement the subject matter claimed herein.

What is claimed is:

1. Device, comprising:
at least one computer memory that is not a transitory signal and that comprises instructions executable by at least one processor to:
present on a display a user interface (UI), the UI indicating a location of the device on which the UI is presented, along with locations of plural vehicles in a wireless network that includes a vehicle in which the UI is presented, the locations of the other vehicles being received through the wireless network, wherein the UI presents arrows whose magnitudes and directions are defined by headings and speeds of respective vehicles as reported via the wireless network.

2. The device of claim 1, comprising the at least one processor.

3. The device of claim 1, wherein the UI presents an alpha-numeric indication of a speed of a vehicle other than the vehicle in which the UI is presented.

4. The device of claim 1, wherein the UI includes an alpha-numeric indication of a type of a vehicle reporting via the wireless network.

5. The device of claim 1, wherein the UI presents icons unique to vehicle types based on type information reported by the vehicles through the wireless network.

6. The device of claim 1, wherein the UI presents an alpha numeric indication of a vehicle having a speed satisfying a threshold.

7. Device, comprising:
   at least one computer readable storage medium bearing instructions executable by a processor; and
   at least one processor configured for accessing the computer readable storage medium to execute the instructions to configure the processor to:
   present on a display a user interlace (UI) including one or more filter selectors selectable to filter traffic/road reports uploaded from vehicle ad hoc networks (VANETs) and presented on the UI, the one or more filter selectors including two or more of:
   a "local" selector which when selected causes information to be presented on the display showing information only within a predetermined distance of the display,
   a "state" selector which when selected causes information to be presented on the display showing information only for an entire state in which the display is located, and
   a "national" selector which when selected causes information to be presented on the display showing information only for an entire nation in which the display is located.

8. The device of claim 7, wherein the UI indicates a location of the device on which the UI is presented, along with locations of plural vehicles in a wireless mesh network that includes a vehicle in which the UI is presented, the locations of the other vehicles being received through the mesh network.

9. The device of claim 7, wherein the UI presents arrows whose magnitudes and directions are defined by headings and speeds of respective vehicles as reported is the VANET.

10. The device of claim 7, wherein the UI presents an alpha-numeric indication of a speed of a vehicle other than the vehicle in which the UI is presented.

11. The device of claim 7, wherein the UI includes an alpha-numeric indication of a type of a vehicle reporting via the VANET.

12. The device of claim 7, wherein the UI presents icons unique to vehicle types based on type information reported by the vehicles through the VANET.

13. The device of claim 7, wherein the UI presents an alpha numeric indication of a vehicle having a speed satisfying a threshold.

14. The device of claim 7, wherein the filter selectors include all of a "local" selector which when selected causes information to be presented on the display showing information only within a predetermined distance of the display, a "state" selector which when selected causes information to be presented on the display showing information only for an entire state in which the display is located, and a "national" selector which when selected causes information to be presented on the display showing information only for an entire nation in which the display is located.

15. The device of claim 7, wherein the UI presents indications based on information reported by a VANET indicating current road condition.

16. The device of claim 7, the one or more filter selectors including a "local" selector which when selected causes information to be presented on the display showing information only within a predetermined distance of the display.

17. The device of claim 7, the one or more filter selectors including a "state" selector which when selected causes information to be presented on the display showing information only for an entire state in which the display is located.

18. The device of claim 7, the one or more filter selectors including a "national" selector which when selected causes information to be presented on the display showing information only for an entire nation in which the display is located.

* * * * *